United States Patent [19]

Lee

[11] Patent Number: 4,850,508

[45] Date of Patent: Jul. 25, 1989

[54] LITTER DISPOSAL MECHANISM

[76] Inventor: Lawrence K. Lee, 10233 Thomas Ave., S., Bloomington, Minn. 55431

[21] Appl. No.: 215,292

[22] Filed: Jul. 5, 1988

[51] Int. Cl.$^4$ .............................................. B65D 85/00
[52] U.S. Cl. .................................... 220/407; 206/554; 383/9
[58] Field of Search ..................... 220/407; 206/554; 383/9, 37

[56] References Cited

U.S. PATENT DOCUMENTS

| | | | |
|---|---|---|---|
| 2,796,309 | 6/1957 | Taylor | 206/554 X |
| 3,380,579 | 4/1968 | Pinto | 206/554 X |
| 3,608,712 | 9/1971 | Savoie | 220/407 X |
| 3,760,975 | 9/1973 | Nilsson | 220/31 R |
| 4,319,694 | 3/1982 | Nehrbass | 220/407 |
| 4,349,123 | 9/1982 | Yang | 220/407 |
| 4,363,405 | 12/1982 | Christie | 220/407 X |
| 4,366,916 | 1/1983 | Guido et al. | 206/554 X |
| 4,506,801 | 3/1985 | Origuchi | 206/554 X |
| 4,527,693 | 7/1985 | Membrino | 206/554 |
| 4,708,243 | 11/1987 | Nailon | 206/554 X |
| 4,712,684 | 12/1987 | Boeckmann | 206/554 |
| 4,721,226 | 1/1988 | Yurko | 220/17 X |
| 4,769,126 | 9/1988 | Roen et al. | 206/554 |
| 4,796,759 | 1/1989 | Schisler | 206/554 |

Primary Examiner—Steven M. Pollard

[57] ABSTRACT

A litter disposal mechanism usable in an automotive vehicle, wherein a flexible plastic bag is suspended in front of a container for a supply of replacement bags. When the suspended bag is filled a new bag can be withdrawn from the container to be suspended in front of the container. The motorist always has replacement bags available; he/she is not likely to be without a litter bag.

10 Claims, 1 Drawing Sheet

LITTER DISPOSAL MECHANISM

BACKGROUND OF THE INVENTION

This invention relates to a litter disposal mechanism especially designed for use in an automotive vehicle.

Quite often motorists use litter bags in their automobiles to contain candy wrappers, napkins, empty cigarette packages, etc. Usually the litter bag is suspended from the vehicle dashboard so that it is readily accessible to the driver and front-seat passenger. Many times, after the bag is filled and thrown into the trash the motorist forgets to replace the bag with another empty bag.

My invention contemplates a container mechanism for holding a supply of litter bags in a readily accessible position near a bag-suspension mechanism. When a bag is filled and discarded a new bag can be withdrawn from the container mechanism and immediately attached to the bag-suspension mechanism. The invention eliminates the possibility that the motorist will not have an empty bag available when needed.

SUMMARY OF THE INVENTION

In a preferred form this invention comprises a box-like container for storing a roll of folded bags; the container front wall has a transverse slot therein for manual withdrawl of an individual bag from the supply roll. The withdrawn bag can then be attached to a bag-suspension hook mechanism that projects forwardly form the container front wall the suspended bag hangs down from the container in a position to receive litter tems.

The container can be a relatively small structure adapted for disposition in an automotive vehicle, e.g. on the vehicle dashboard.

THE DRAWINGS

DESCRIPTION OF A PREFERRED EMBODIMENT OF THE INVENTION

Figure 1:
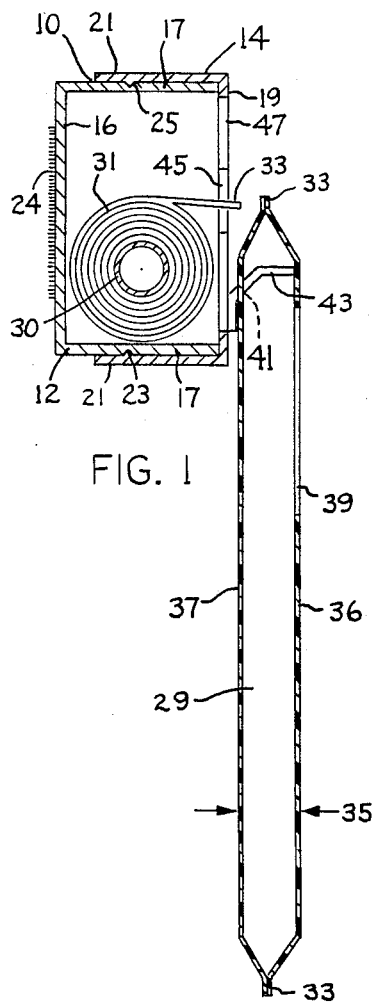
FIG. 1 is a sectional view taken on line 1—1 in FIG. 2.

The illustrated embodiment of my invention comprises an elongated container 10 that includes a box section 12 and a over section 14. Box section 12 comprises an upstanding rear wall 16 and four forwardly-extending flange walls 17. Cover sections 14 comprises a front wall 19 and four rearwardly-extending flange walls 21. Walls 21 telescope onto walls 17 to retain cover section 14 in place on box section 12. Ribs 23 and interfitting recesses 25 may be provided on some of the telescoped walls to ensure that the cover stays on the box. The cover section can be manually removed from the box when necessary.

The box rear wall 16 has means thereon for mounting the box in an automotive vehicle, e.g. on the vehicle dashboard. The mounting means can take any of several forms, e.g. screws, suction cups, magnets, a screw-type clamp, contact adhesive strips, etc. FIG. 1 shows the mounting means as a fabric strip 24 that includes miniature hook (or loop) fibers projecting from the box rear wall; a cooperating strip of miniature loop (or hook) material would be adhered to the vehicle dashboard for interlocking engagement with the fibers on strip 24, for thereby removably attaching box section 12 to the vehicle dashboard. The interlocking fabric strip materials are commercially available under the tradename VELCRO.

A supply of litter bags is contained within container 10. As shown in the drawings, the bag material is rolled in spiral fashion around a tubular mandrel 30. The bag material may be formed of a thin flexible plastic film material that is extruded or otherwise formed into a continuous tubular cross-sectional configuration. At spaced points along the plastic tube the confronting plastic walls are heat-sealed together, as at 33, to form closed ends for the separate bags. Perforations are formed at midpoints along the sealed sections, such that individual bags can be torn from the rolled-up supply (after withdrawl from container 10). The tubular bags are preferably rectangular in cross section, such that each individual bag as a transverse side-to-side dimension 32 of about five or six inch, and a front-to-rear dimension 35 on the order of one or half or one inch. As the bag fills with litter it tends to change its shape toward a circular cross section.

Figure 2:
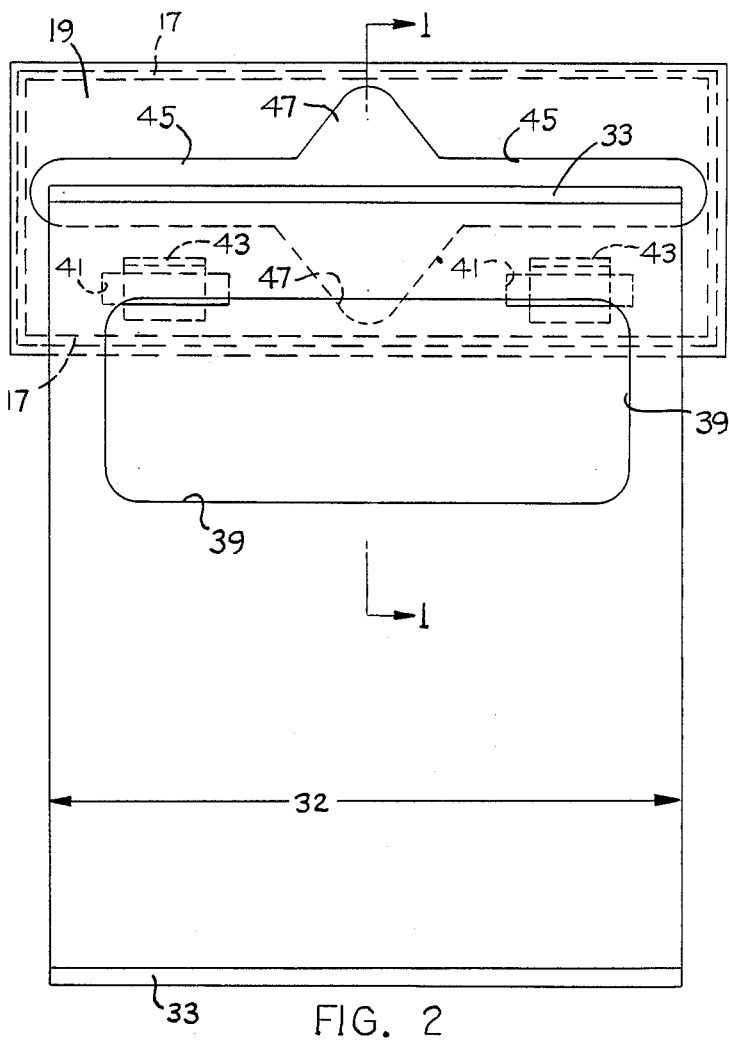
FIG. 2 is a front elevational view of a litter disposal mechanism embodying my invention.

Each bag 29 comprises a front wall 36 and rear wall 37. A rectangular litter-reception opening 39 is formed in wall 36; two laterally-spaced slots 41 may be formed in wall 37 (slots 41 are not visible in FIG. 1, but appear as dashed lines in FIG. 2). Each slot 41 is adapted to fit over (around) a hook structure 43 that extends upwardly and forwardly from container front wall 19, whereby the bag is suspended in front of the container, as shown generally in FIG. 1.

Each hook structure 43 includes a horizontally-extending tip area that contacts bag front wall 36 to space walls 36 and 37 apart, thereby making it somewhat easier to insert items of litter into the bag.

While the bag material is in roll form in container 10 the exposed end edge of the material can be manually grasped for withdrawal out of the container. Front wall 19 of the container has a slot 45 extending thereacross for substantially the full width of the container. At its midpoint slot 45 is enlarged vertically, as at 47, to facilitate manual gripment of the end edge of the bag material. In a typical situation the person grasps the bag material by extending his/her thumb and first finger through slot enlargements 47.

As seen in FIG. 1, the withdrawn bag 29 is separated from the roller-up bag material web 31. Thus, after the bag has been drawn outwardly through slot 45 it is torn from the bag material web, and then placed on bag suspension hooks 43. However, it is not necessary to sever the withdrawn bag from the material web before placement on the suspension hooks; the bag can remain connected tot the material web while it is suspended from hooks 43. In that event the bag can be severed from the bag material web 31 after the bag has been filled with litter. As before noted, items of litter are deposited into the bag through opening 39 in front wall 36.

Prior to my invention others have suggested devices for storing bags in folded or compacted form. U.S. Pat. No, 3,800,503 to R. Maki shows a hollow structure 23 for containing bag material in roll form. FIG. 4 of the Maki drawings shows bag material stored in folded serpentine form.

U.S. Pat. No. 3,760,975 to S. Nilsson shows a wastebasket wherein bag material is stored as a roll 16. U.S. Pat. No. 4,349,123 to Y. Yang shows a web of bag material stored in serpentine form (FIG. 3). Other patents showing generally similar arrangements are U.S. Pat.

No. 4,319,694 to J. Hehrbass and U.S. Pat. No. 4,721,226 to E. Yurko.

My invention contemplates a box-like container for storing bag material in folded compacted form, together with hook-type suspension means for hanging a bag from the front wall of the container, with the major portion of the bag disposed below the container. The contemplated mechanism is especially useful in automobiles for litter-containment purposes.

The drawings show one particular form that the invention can take. Other forms are possible.

I claim:

1. Litter disposal mechanism comprising a container having a front wall; a supply of folded connected bags disposed within the container; a slot in the container front wall for withdrawing a bag from the container front wall near the bag-withdrawl slot, whereby after a bag has been withdrawn from the container said bag can be attached at its upper end to the bag suspension means, with the major portion of the bag disposed below the container.

2. The litter disposal mechanism of claim 1 wherein said bag suspension means comprises two laterally spaced hooks.

3. The litter disposal mechanism of claim 2 wherein each bag has a front wall and a rear wall; each bag front wall having a litter-reception opening therein; each bag rear wall having slot means therethrough designated to fit over the laterally spaced hooks.

4. The litter disposal mechanism of claim 2 wherein the laterally spaced hooks have front-to-rear dimension sufficient to maintain the bag walls spaced apart when the bag is suspended from the hooks.

5. The litter disposal mechanism of claim 4 wherein each hook extends upwardly and forwardly from the container front wall.

6. The litter disposal mechanism of claim 1 wherein the bag-withdrawl slot extends across substantially the full width dimension of the container front wall.

7. The litter disposal mechanism of claim 6 wherein the bag-withdrawl slot is enlarged at its mid point to facilitate manual gripment of a bag within the container.

8. The litter disposal mechanism of claim 1 and further comprising means for attaching the container to the dashboard of an automotive vehicle.

9. The litter disposal mechanism of claim 1 wherein said container comprises a box section for containment of a supply of folded bags, and a cover section telescoped over the box section.

10. The litter disposal mechanism of claim 9 wherein the cover section comprises the aforementioned front wall and a peripheral flange extending rearwardly from said front wall for telescopement onto the box section.

* * * * *